United States Patent Office 3,068,113
Patented Dec. 11, 1962

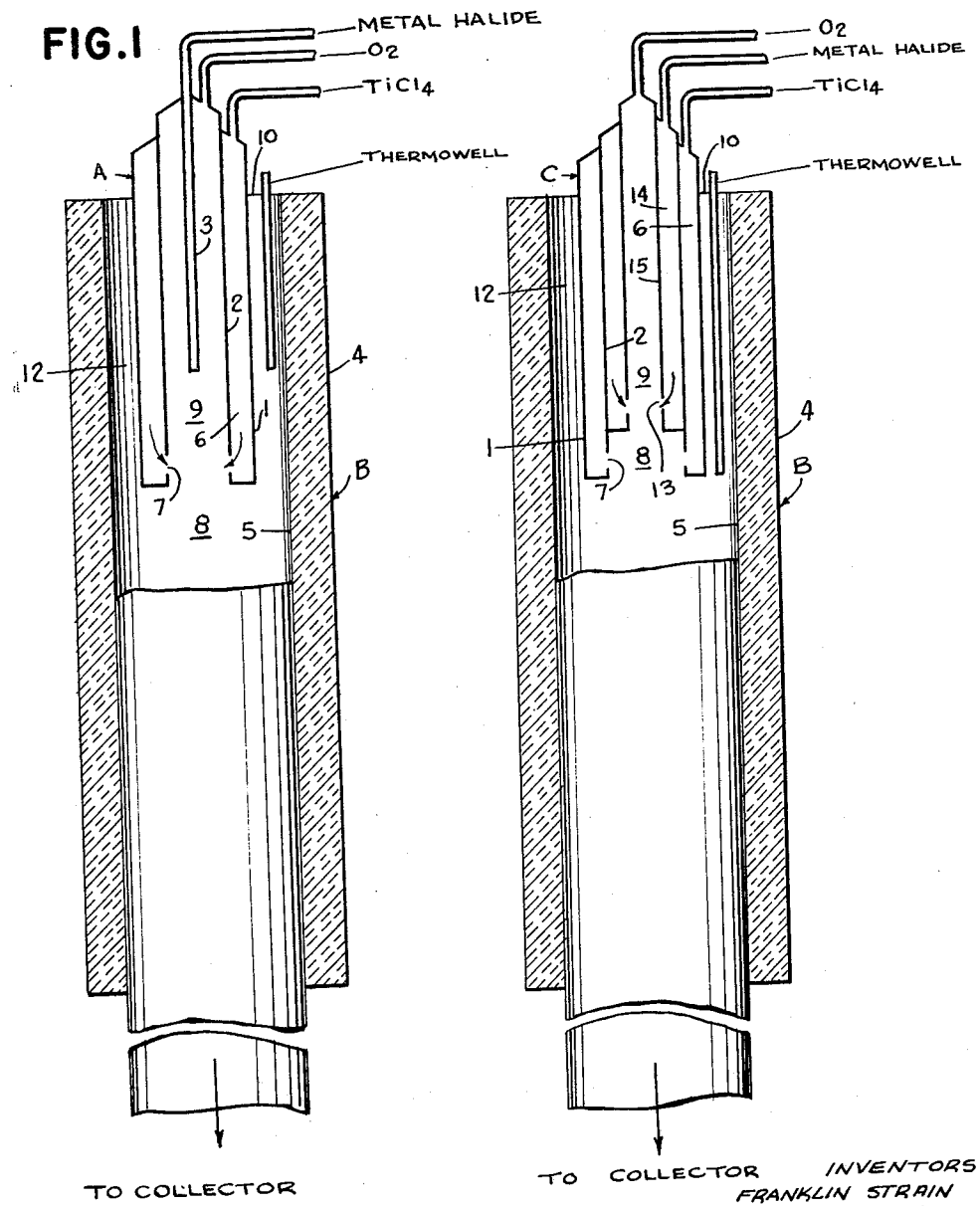

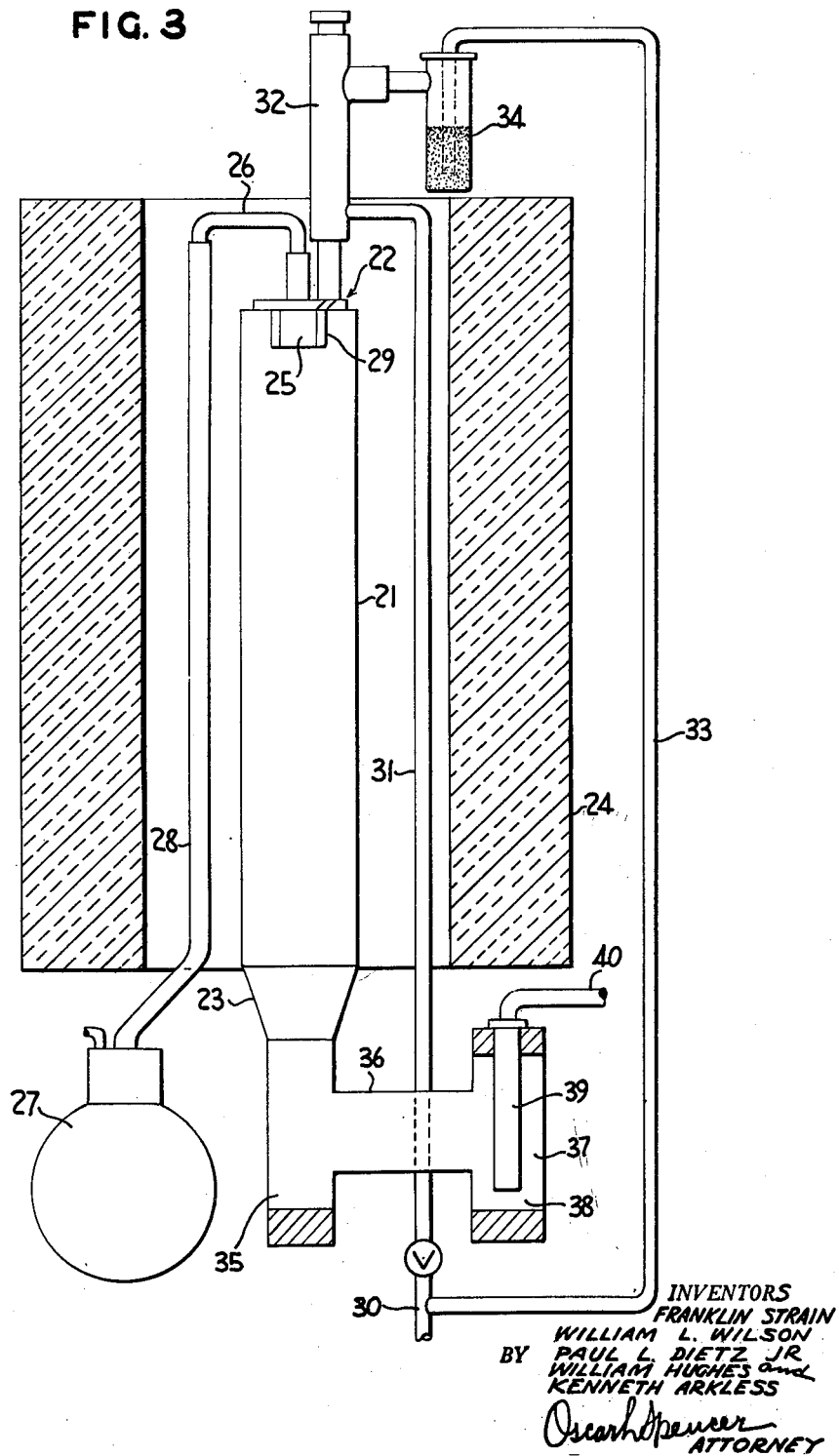

3,068,113
METHOD OF PREPARING METAL OXIDES
Franklin Strain and William L. Wilson, Barberton, and Paul L. Dietz, Jr., Akron, Ohio, and William Hughes and Kenneth Arkless, Stockton-on-Tees, England; said Strain, Wilson and Dietz, Jr., assignors, by mesne assignments, to Pittsburgh Plate Glass Company, and said Hughes and Arkless, assignors to British Titan Products Company Limited, Billingham, England, a British company
Filed June 21, 1960, Ser. No. 37,789
9 Claims. (Cl. 106—300)

The invention relates to the production of titanium dioxide pigment by the vapor phase oxidation of a titanium halide, especially titanium tetrachloride, that is to say by the reaction of the vapor of a titanium halide with oxygen or a gas containing free oxygen.

Titanium dioxide is well known as a white pigment and many methods of producing this in either of the crystallized forms, anatase or rutile, have been described with special reference to producing a white product of controlled particle size.

More recently there has been developed a method of preparing titanium dioxide from titanium tetrachloride by oxidation with oxygen or oxygen-containing gases. This has an advantage in that the chlorine liberated may be recovered in various convenient ways for use in attacking the titaniferous minerals in the making of further quantities of titanium tetrachloride. However there are problems involved in producing a product which is not only uniform in particle size but also has a particle size which approximates the optimum requirements for pigmentary purposes.

In the older sulphate processes it has been thought that the optimum particle size of a pigment is of the order of 0.25 micron. In the manufacture of titanium oxide by the vapor phase oxidation, it has proved difficult in practice to attain this optimum particle size and the general tendency has been to produce an average particle size of up to 10 microns. For obtaining the best results it has been necessary to introduce operational restrictions which on stepping up to larger scale have introduced complications.

It is the object of the present invention to lower the mean particle size and to reduce the scatter in particle size of titanium dioxide produced by the reaction of titanium tetrahalide and oxygen or oxygen-containing gases in vapor phase.

According to one embodiment of the present invention, a volatile metal halide is contacted, intermingled, or admixed at an elevated temperature with an oxygen-containing gas capable of reacting with said metal halide to produce finely-divided, white, non-discoloring metal oxides, the oxygen-containing gas containing oxygen in substantial excess of a stoichiometric proportion based on the metal halide. Immediately thereafter the resulting admixture is contacted with titanium tetrachloride at a temperature between about 700° C. and 1500° C. to produce pigmentary titanium dioxide which is removed substantially as formed.

Preferably, a substantially anhydrous oxygen-containing gas, such as air or oxygen, is pre-heated to a temperature between 500° C. and 1200° C. before being contacted with the metal halide, such as aluminum chloride. Similarly, the aluminum chloride may be pre-heated to the same temperature before coming in contact with the water-free oxygen-containing gas.

The resulting admixture of the volatile metal halide and the oxygen-containing gas is contacted or merged almost immediately after formation thereof, usually in less than about eight seconds, and preferably less than about three seconds or between about 0.1 to 3 seconds after formation, with gaseous or vaporous titanium tetrachloride.

Although the exact nature of the admixture of the volatile metal halide and oxygen-containing gas prior to contact with the titanium tetrahalide is not understood, it is generally felt that the admixture comprises a multiplicity of extremely small metal oxide nuclei (e.g. $Al_2O_3$) suspended in the oxygen-containing gas. Generally the metal oxide nuclei (e.g., $Al_2O_3$) suspended in the oxygen-containing gas are commingled with the titanium tetrahalide reactant before the metal oxide nuclei or solids grow in average particle size beyond about 0.15 micron in diameter, preferably with the nuclei size being between 0.05 and 0.1 micron.

The volatile metal halide and oxygen-containing gas in the admixture may also be in the process of reacting to form the white metal oxide nuclei at the time of contact with the titanium tetrahalide, the temperature of the admixture being high enough to cause this reaction to occur. One way in which this admixture may be characterized, therefore, is by describing it as a reacting admixture of oxygen-containing gas and volatile metal halide. The volatile metal halide in such an admixture may be in the form of the resulting metal oxide, or may be in a state of incipient reactivity with the oxygen-containing gas at the time of contact with the titanium tetrahalide.

According to a preferred embodiment, as will be seen hereinafter, the vaporous titanium tetrahalide is radially-introduced or impinged upon a moving stream of the suspension or the admixture. Furthermore, separate streams, at least one comprising the suspension or admixture and at least one being titanium tetrahalide, may be angularly converged into merging contact according to the instant invention. In addition, very desirable results are attained by pre-heating the titanium tetrahalide to a temperature between about 500° C. and 1200° C.

According to a further embodiment a pre-mixed suspension of metal oxide nucleating solids of desired size in oxygen-containing gas is prepared and pre-heated to the temperatures taught herein and contacted almost immediately thereafter with titanium tetrahalide as contemplated herein. If desired, the metal oxide nucleating solids may be suspended in a gaseous medium other than oxygen, only inert with respect to the solids, the resulting suspension pre-heated, and then contacted very shortly thereafter with separate streams of pre-heated oxygen-containing gas and titanium tetrahalide. Typically, gaseous nitrogen might be employed as the inert medium.

The instant invention will be understood more clearly from the attached drawings which are merly illustrative and not intended to limit the scope of the discovery.

FIGURES 1, 2 and 3 are diagrammatic vertical sections of burner and furnace assemblies suitable for the present invention.

Referring to FIGURE 1, burner assembly A comprises three vertically-disposed tubes 1, 2 and 3 which pass into furnace assembly B made up of electric heating means 4 and tube 5. Tube 3 is a pilot jet of small diameter and is disposed within tube 2 and is concentrically-located with respect thereto. Tube 2, in turn, is disposed within tube 1 and is concentrically located with respect thereto.

The annulus or annular space 6 defined by the walls of tubes 1 and 2 is sealed at its lower end except for circumferential slot 7 provided in the lower end of tube 2. As will be seen hereinafter and as is evident from the drawing, tubes 1, 2 and 3 are spaced apart from the internal walls of the tubes they inhabit, thus providing annular spaces in burner assembly A. Burner tubes 1, 2 and 3 are open at their upper ends. At its lower end tube 3 communicates with reaction zone 9, tube 2 opens into reaction zone 8 and tube 1 communicates via circumferential slot 7 with reaction zone 8.

The annulus 12 provided between tube 1 of burner assembly A and tube 5 has a thermowell disposed therein. The thermowell passes downwardly through cover 10 of furnace assembly B and extends about the same distance into furnace assembly B as pilot jet 3.

Pilot jet 3, as shown in the drawing, is retracted into tube 2 to provide a predetermined distance between its lower tip and circumfertential slot 7. Tube 5 extends downwardly beyond heating means 4 to a collector not shown but indicated.

FIGURE 2 differs from FIGURE 1 only in that in burner assembly C, tube 15 (corresponding to tube 3 in FIGURE 1) is not a pilot jet but a wider tube retracted within tube 2, concentrically-located with respect thereto and spaced apart from the internal wall of tube 2, thus providing annular space 14 which is sealed at its lower end except for circumferential slot 13 provided in the lower end of tube 15 and opening into reaction zone 9. The lower tip of tube 15 is above circumferential slot 7, thus providing a predetermined distance between circumferential slots 13 and 7.

FIGURE 3 shows a vertical cylindrical reaction chamber 21 having a burner assembly 22 inserted into its upper end and being reduced to a conduit 23 leading away from its lower end. This reaction chamber unit is enclosed within an electrically wound furnace 24. The burner assembly consists of a central jet 25 through which titanium tetrachloride is admitted via a conduit 26 leading from a titanium tetrachloride reservoir 27 and a preheating conduit 28. The outer annulus 29 of the burner through which oxygen- or oxygen-containing gases are admitted to the reaction chamber is fed by oxygen emanating from a conduit 30, the greater part of which is preheated via a conduit 31 and enters a chamber 32 leading to the annulus.

Part of the oxygen supply leading to the outer annulus 29 is by-passed via a conduit 33 to enter a vessel 34 containing finely divided alumina prepared as described below. From the vessel 34, the oxygen, laden with the alumina picked up by transit therethrough, enters the chamber 32 to meet the main preheated oxygen stream. The oxygen mixture made up from the preheated gas from the conduit 31 and the cold stream laden with alumina particles from the vessel 34 becomes admixed in chamber 32 and thence is admitted into the annulus of the burner 29.

The conduit 23 at the base of the reaction chamber and below the furnace leads to a chamber 35 in which some of the titanium oxide product of reaction is collected by settling the residual gases. The latter, which entrain some of the titanium oxide in suspension, thereafter pass through a conduit 36 into a filter box 37 wherein the remaining product is removed by filtration and deposited at the base 38. The product gases passing through a filter 39 are suitably discharged via ducting 40.

The aluminum oxide charged to vessel 34 may be prepared by controlled vapor phase oxidation reaction so that the product consists of particles which have an average size of less than 0.1 micron. The alumina in one instance was prepared in a cylindrical chamber 3 inches in diameter and 36 inches long into which was inserted at one end a burner having a central jet of 3 mms. diameter and an outer annulus having circular walls of 15–20 mms. diameter. The other end of the chamber was suitably connected for the collection of the product. Into the central conduit of the burner was led aluminum chloride generated by passing chlorine at the rate of 0.2 liter per minute over molten aluminum at 800°/900° C.

The oxygen was fed through the outer annulus at the rate of 1.5 liters per minute to give an $O_2:AlCl_3$ molar ratio of 11:1. It is not necessary to use such high molar ratios of oxygen to aluminum chloride for this purpose but it has been found that the production of fine particle size alumina is improved by the use of high $O_2:AlCl_3$ molar ratios. Both these reactants were separately preheated before admission to the reaction chamber. The reaction chamber into which they were led was also preheated to 970° C. By this means reaction took place and $\gamma$ alumina with mean particle size of 0.06 to 0.10 micron was produced. This material was in part settled and in part filtered from the reactant gases and was transferred for the purpose of effecting nucleation in the main reaction for the production of titanium oxide as hereinafter described.

In operation of the apparatus of FIGURE 3, the reaction chamber is preheated to a temperature of 800 to 1100° C. and the titanium tetrachloride from the reservoir 27 is vaporized and preheated in the conduit 28 to enter the central jet of the burner 25 at a temperature of the order of 800–1100° C. In the meantime oxygen gases which may vary in molar proportion from 1–4:1 ($O_2:TiCl_4$) are admitted via annulus 29, derived by passage of 67% of the oxygen supply through the preheater conduit 31 to enter the mixing vessel 32 and the annulus 29 so as to have a temperature on admission into the furnace from 800–1100° C. The remaining 33% of the oxygen supply is conveyed through the conduit 33 to pass through a bubbler type apparatus 34 in such a way that the oxygen passes below the surface of a mass of finely divided alumina, prepared as previously described. This oxygen stream admixes with the preheated oxygen in vessel 32 and the mixture generally passes into the annulus 29 for reaction. The reaction takes place within the furnace with the result that titanium oxide is precipitated according to the reaction $TiCl_4 + O_2 = TiO_2 + 2Cl_2$. The titanium oxide as previously described is collected at the base of the chamber 35 or in the filter chamber 38.

An important feature of the operation of the device shown in FIGURE 3 is the entrainment of a proportion of alumina content in the vessel 34 into the oxygen stream passing via conduit 33. The concentration of particles entrained in the gas may vary from about 0.0001 to 0.5 g./l and is controlled so that the proportion of alumina entering the reaction chamber varies from about 0.01 to 5 mole percent, or even from about 0.01 to 10 mole percent of the total $TiO_2$ precipitated by reaction of the oxygen gases with the titanium tetrachloride.

It will be obvious that there are many ways in which the alumina (or other nuclei) may be admitted to the reactor shown in FIGURE 3. For instance, it can be admitted in a similar way by admixture with titanium tetrachloride or it can be admitted in part into both reactant streams. It can also be prepared by direct generation as hereinabove described, e.g., oxidation of aluminum chloride, performed concurrently with the process of oxidizing the titanium halide. In this case the admission of the nuclei may be directly into the mixing chamber 32 or into a similar mixing chamber into which titanium tetrachloride vapors are admitted, or into both reactant stream. The method of admission of the alumina, for example, can obviously be varied in many ways and the alumina can be derived from a number of salts or compounds of aluminum. Preferably the aluminum salt is the halide, and more particularly aluminum chloride, when the oxidation relates to the oxidation of titanium tetrachloride. In other words, if the alumina on formation is admitted immediately into the reaction chamber, it is preferable to produce it from a halide corresponding to the halide of titanium which is to be oxidized in the main reaction chamber.

Whilst the gases used for oxidation of the titanium tetrachloride have been described in particular as relating to oxygen, it will be obvious that oxygen-containing gases, e.g., air, may similarly be employed.

As already indicated the oxidation of the titanium tetrachloride is by no means limited to admission of the reactants either preheated or otherwise through concentric burner. The gases may, for instance, be admitted into the reaction chamber through separate conduits which may directed in parallel or otherwise, e.g., in opposite directions. They may also be admitted into the fluid or dynamic bed reaction chamber, in which case the main reaction will occur in the bed and/or above the bed.

It is to be understood that the invention is also applicable when there is an addition such as silicon tetrachloride to the titanium halide vapors to control particle size, or of aluminum chloride to the titanium tetrachloride for the same purpose and for controlling the degree of rutilization of the product. It is also applicable when there is an addition of moisture, more particularly to the oxygen-containing gases, to effect control in particle size, or when such adulterating agents, or others, are added either directly or are produced in situ in the main reaction zone and caused to contact or merge with the titanium tetrahalide reacting mixture.

The instant discovery will be best understood by reference to the following examples which, although detailed, are not intended to restrict the scope of the invention:

EXAMPLE I

Referring to FIGURE 1, furnace assembly B was made up of an electric furnace 4 which was 24-inches long and had a 4-inch (diameter) quartz tube 5 vertically-disposed therein. The upper and lower halves of heating means 4 were separately controlled as to temperature. A burner assembly A comprising tubes 1, 2 and 3 was directed, as described above, into furnace assembly B, the ends of tubes 1 and 2 extending to a point about 6 inches below the furnace top 10.

Tubes 1, 2 and 3 were fabricated from silica tubing (quartz and Vycor) and had internal diameters, respectively, of 17 millimeters, 10 millimeters and 1.1 millimeters. The tip of pilot jet 3 was positioned 2 or 3 centimeters (see Table I) above circumferential slot 7, thus providing reaction zone 9. Circumferential slot 7 was 0.5 millimeter in width. It is obvious from these dimensions that FIGURE 1 is not drawn to scale.

In operation gaseous $TiCl_4$ was fed via space 6 through slot 7 to reaction zone 8, while simultaneously gaseous $AlCl_3$ was fed via jet 3 into reaction zone 9 and gaseous anhydrous oxygen passed downwardly through tube 2. The $AlCl_3$ and oxygen mixed in zone 9, and the resulting admixture almost immediately after formation contacted the titanium tetrachloride flowing through slot 7. The admixture and titanium tetrachloride streams entered reaction zone 8, where they intermixed and reacted to produce titanium dioxide.

The temperature in reaction zone 8 was maintained by means of heating means 4 at about 1000° C. throughout a 30 minute run. Product $TiO_2$ passed through tube 5 to the collector (not shown).

The following table gives the reaction conditions in four (4) typical runs:

*Table I*

| Run No. | $TiCl_4$[1] feed rate | $O_2$ molar[2] ratio | $AlCl_3$[3] concentration | Pilot[4] retraction | Pre-heat temp., °C. | Reaction temp., °C. |
|---|---|---|---|---|---|---|
| 1 | 21.4 | 1.17 | 3 | 2 | 950 | 1,000 |
| 2 | 20.9 | 1.20 | 3 | 2 | 930 | 1,000 |
| 3 | 19.9 | 1.26 | 3 | 3 | 950 | 1,000 |
| 4 | 40.0 | 1.25 | 3 | [5] 2 | 930 | 1,000 |

[1] Millimoles per minute.
[2] $O_2/TiCl_4$ molar ratio.
[3] Mole percent, $TiCl_4$ basis.
[4] Distance from tip of pilot jet 3 to slot 7 in centimeters.
[5] Pilot jet 3 used in Run 4 was 2.2 millimeters in diameter.

The $TiO_2$ pigment produced in Example I above was predominantly in the rutile crystalline form, was well-dispersed, of uniform particle size and had good tinting strength. The average particle size thereof was about 0.2 micron.

EXAMPLE II

The runs in Table I of Example I are repeated using the burner and furnace assembly depicted in FIGURE 2 of the drawings.

Furnace assembly B is identical in dimensions to the corresponding furnace assembly B in FIGURE 1 described in Example I, supra.

Burner assembly C is fabricated from a refractory material. Tubes 1, 2 and 15 have internal diameters, respectively of 37.5 millimeters, 25 millimeters and 17.5 millimeters, the walls of tubes 2 and 15 being, respectively, about 3 millimeters thick. Circumferential slots 13 and 7 are, respectively, 0.5 millimeter and 1 millimeter in width, there being a distance of about 2.5 centimeters between the slots.

Runs 5, 6, 7 and 8 are made using burner asssembly C just described and under the same conditions, respectively, given in Table I of Example I, for runs 1, 2, 3 and 4, the only difference being that the aluminum chloride is directed through tube 2 and circumferential slot 13, and anhydrous oxygen passes through tube 15 as shown in FIGURE 2 of the drawing.

According to the instant discovery, $AlCl_3$, $O_2$ and $TiCl_4$ preferably are pre-heated separately to a temperature between about 800° C. and 1100° C. prior to contact. Although this is a preferred embodiment, pre-heat temperatures from about 500° C. to about 1200° C. are contemplated herein and reaction temperatures ranging from about 700° C. to about 1500° C. preferably between 850° C. and 1100° C.

The mole ratio of titanium tetrahalide to oxygen fed to reaction zone 8 may range from 2:1 to 1:10, preferably from 1:1 to 1:5.

While Examples I and II illustrate producing an admixture of aluminum chloride and oxygen containing gas capable of yielding $Al_2O_3$ solids immediately upstream from the $TiO_2$ reaction zone and contacting the admixture immediately thereafter with gaseous $TiCl_4$, other volatile metal halides capable of producing white, non-discoloring, non-contaminating solid metal oxide nuclei having an average particle size between about 0.01 and 0.15 micron, preferably between 0.05 and 0.1 micron, when admixed with oxygen under the described conditions, are also contemplated for use in the referred to process. Included among the preferred metal halides are the halides of silicon, titanium, zinc, boron, zirconium, antimony, tin, and the like, which may be used per se or in any combination of one with the other or with $AlCl_3$. The voltaile metal halides are preferably capable of forming white metal oxides, in situ, as it were, when contacted with an oxygen containing gas at a temperature high enough to cause reaction to occur. Otherwise stated, an admixture of the volatile metal halides and an $O_2$-containing gas at a temperature high enough to cause reaction between oxygen and the volatile metal halide may be prepared, and in less than 8 seconds after preparation thereof contacted with titanium tetrahalide.

While Example I, for instances, teaches a single circumferential slot as the preferred means for feeding $TiCl_4$ to reaction zone 8, other modifications such as a plurality of slots or openings providing spray-like streams of $TiCl_4$ capable of impinging upon a moving stream of suspension, are also contemplated. Furthermore, although radial introduction of $TiCl_4$ into a moving stream of suspended solids is preferred, other methods for contacting the streams are within the purview of the present discovery. For example, a stream comprising the suspension and a stream containing the $TiCl_4$ may be made to angularly converge into merging contact, as described above.

The concentration of the volatile metal halide, such as $AlCl_3$, in the admixture of volatile metal halide and oxygen containing gas contacting the titanium tetrahalide may range from about 0.1 up to about 10 mole percent, preferably from about 0.5 to 4 mole percent, based upon the titanium tetrahalide undergoing reaction, and calculated as the metal oxide, e.g., $Al_2O_3$. A higher concentration up to about 20 mole percent or more may be employed, however.

While the embodiments of Examples I and II, above, disclose only distances in the range of 2 to 3 centimeters between the tip of pilot jet 3 (or circumferential slot 13) and circumferential slot 7, distances between about 0.5 centimeter and about 3.0 centimeter or more are contemplated herein.

According to a further embodiment of the present invention, a pre-mixed suspension of metal oxide nucleating solids of desired size in oxygen-containing gas is preheated to the temperatures taught herein and contacted almost immediately thereafter with $TiCl_4$ as described in the following examples. It should be understood that in the following examples, the metal oxide nucleating solids may be suspended in a gaseous medium other than oxygen, only inert with respect to the solids, the resulting suspension pre-heated and then contacted very shortly thereafter with separate streams of pre-heated oxygen-containing gas and $TiCl_4$. Typically, gaseous nitrogen might be employed as the inert medium.

EXAMPLE III

Alumina for nucleation was prepared by reacting aluminum chloride vapor with oxygen in a reaction chamber provided with a simple concentric burner. The aluminum chloride was generated by passing chlorine at the rate of 0.2 liter per minute measured at ordinary temperatures over molten aluminum at 850° C. The oxygen was fed at the rate of 1.5 liters per minute as measured at ordinary temperatures to give an $O_2:AlCl_3$ molar ratio of 11:1. The reactants were separately pre-heated to the reactor temperature of 970° C. and were fed through the burner, the aluminum chloride through the central conduit of 3 mms. diameter and the oxygen through the annulus bounded by walls of 15 and 20 mms. diameter. The pre-heated gases entered via the burner to the reaction chamber pre-heated to 970° C. and therein reacted to produce alumina which was found to have a mean particle diameter of 0.06–0.10 microns.

Using the apparatus as diagrammatically shown in FIGURE 3, the concentric burner 22 was constructed in steatite and had a central jet of 5 mms. diameter through which the pre-heated titanium tetrachloride was injected. It had an outer annulus contained by walls 15–25 mms. diameter through which the oxygen was fed. The reactor, constructed in silica ware 6 inches in diameter and 36 inches long was preheated to 900° C. The titanium tetrachloride was fed at the rate of 15 cc. of liquid $TiCl_4$ per minute and the oxygen at the rate of 12.2 liters per minute. In both cases the reactant was heated to a temperature of 900° C. It will be seen that the molar ratio of $O_2:TiCl_4$ is approximately 4:1. 30% of the oxygen stream was by-passed through the vessel 34 of the nature of a bubbler bottle, and containing the alumina product as prepared above. This oxygen stream thereby entrained alumina particles amounting to 4.5% $Al_2O_3$ based on the $TiO_2$ produced in the reactor. Operating in this way for one hour the product obtained had a particle size predominantly 0.2–0.4 micron.

When the same operation was conducted without the by-passing of oxygen through the bubbler bottle 14 to entrain alumina, in other words when the oxygen was admitted directly to the reactor without having any alumina to function as nuclei, the $TiO_2$ had a particle size of 0.6–0.8 micron.

EXAMPLE IV

Using the apparatus as in Example III, with identical $TiCl_4$ and $O_2$ flow rates, $SiO_2$ of mean particle size 0.04 micron, prepared by the fluid bed oxidation of $SiCl_4$ was used in place of $Al_2O_3$ to give 3.2% $SiO_2$ on $TiO_2$. Operating in this way for one hour the product obtained had a particle side predominantly 0.2–0.4 micron.

EXAMPLE V

Using the apparatus as in Example III with identical $TiCl_4$ and $O_2$ rates, $TiO_2$ of mean particle size 0.02 micron, prepared by the vapor phase hydrolysis of $TiCl_4$ at 500° C., was used in place of $Al_2O_3$ to give a theoretical nuclei addition of 5%, based on the weight loss from the vessel 34. Operating in this way for one hour the product obtained had a particle size predominantly 0.2–0.4 micron.

Even though the runs in the above examples are at substantially atmospheric pressure, operation under pressure or vacuum is also suitable.

The above advantages and many others will be apparent to the skilled chemist. Not only does the present invention contemplate within its scope modifications within the skill of the art, but the details given hereinabove are not intended to limit the scope of invention, except insofar as limitations appear in the appended claims.

This application is a continuation-in-part of U.S. application Serial No. 745,627, filed June 30, 1958, now abandoned, and U.S. application Serial No. 829,653, filed July 27, 1959, now abandoned.

We claim:

1. A method of preparing finely-divided, pigmentary titanium dioxide which comprises reacting at an elevated temperature a metal halide and an oxygen-containing gas capable of reacting with said metal halide to produce a finely-divided, white, non-discoloring metal oxide, said oxygen-containing gas containing oxygen in substantial excess of stoichiometric proportions basis the metal halide, maintaining the resulting mixture above 500° C., immediately thereafter contacting the resulting suspension of metal oxide solids in oxygen-containing gas with a separate stream of titanium tetrachloride at a temperature between 700° C. and 1500° C., and recovering pigmentary titanium dioxide substantially as formed.

2. The process of claim 1 wherein the finely-divided, white, non-discoloring metal oxide is $Al_2O_3$ having an average particle size below about 0.15 micron.

3. The process of claim 1 wherein titanium tetrachloride is admixed with said suspension in less than about 8 seconds after production of said suspension.

4. In the process of preparing titanium dioxide by merging together separate pre-heated streams of titanium tetrachloride and oxygen in a reaction zone, the improvement which comprises introducing a halide of a metal which forms a white metal oxide into the oxygen stream, the amount of said halide being substantially below stoichiometric proportions based on the oxygen, to thereby form a white metal oxide in said oxygen stream and mixing the resulting oxygen-metal oxide mixture while at a temperature above 500° C., with the titanium tetrachloride.

5. The process of claim 4 wherein the metal halide is aluminum chloride.

6. The process of claim 4 wherein the metal halide is aluminum chloride and the amount thereof is 0.1 to 10 mole percent based on the titanium tetrachloride.

7. A method for the production of titanium dioxide which comprises introducing an oxygen-containing stream having suspended therein preformed finely-divided, white, non-discoloring metal oxide, the greater proportion of which are particles below 0.15 micron, with a separate stream of vaporous $TiCl_4$ to a zone having a temperature of about 700° C. to about 1500° C., the amount of metal oxide so introduced being about 0.1 to about 20 mole percent, basis $TiCl_4$ introduced to said zone, and removing from said zone the resulting effluent containing pigmentary titanium dioxide.

8. The method of claim 7 wherein the metal oxide is aluminum oxide.

9. A method for the production of titanium dioxide which comprises effecting contact between an oxygen-containing gas and a metal halide at a temperature sufficient to produce a metal oxide suspended in said oxygen-containing gas, said metal oxide being a finely-divided, white, nondiscoloring metal oxide, the greater proportion of which are in the form of particles below .15 micron, introducing said suspension with a separate stream of vaporous titanium tetrachloride to a zone having a temperature of about 700° C. to about 1500° C., the amount of meal oxide present in said oxygen-containing gas being about 0.1 to about 20 mole percent, basis titanium tetrachloride introduced to said zone, and removing from the said zone the resulting effluent containing pigmentary titanium dioxide.

References Cited in the file of this patent

UNITED STATES PATENTS

| | | |
|---|---|---|
| 2,437,171 | Pechukas | Mar. 2, 1948 |
| 2,488,439 | Schaumann | Nov. 15, 1949 |
| 2,559,638 | Krchma et al. | July 10, 1951 |
| 2,760,846 | Richmond et al. | Aug. 28, 1956 |